United States Patent
Kaiser et al.

(10) Patent No.: US 7,657,796 B1
(45) Date of Patent: Feb. 2, 2010

(54) SYSTEM AND METHOD FOR DISTRIBUTED STORAGE VERIFICATION

(75) Inventors: Scott D. Kaiser, Belmont, CA (US); Randy R. Taylor, Saratoga, CA (US)

(73) Assignee: Symantec Operating Corporation, Mountain View, CA (US)

( * ) Notice: Subject to any disclaimer, the term of this patent is extended or adjusted under 35 U.S.C. 154(b) by 574 days.

(21) Appl. No.: 11/241,256

(22) Filed: Sep. 30, 2005

(51) Int. Cl.
*G06F 11/00* (2006.01)
*G06F 11/07* (2006.01)

(52) U.S. Cl. .............................. 714/54; 714/5; 714/15; 714/49; 714/764; 709/205; 707/200

(58) Field of Classification Search ............... 714/1–57, 714/820, 764; 718/105, 106; 709/205; 707/200
See application file for complete search history.

(56) References Cited

U.S. PATENT DOCUMENTS

| | | | | |
|---|---|---|---|---|
| 5,632,012 A * | 5/1997 | Belsan et al. | .................... | 714/6 |
| 5,774,717 A * | 6/1998 | Porcaro | ...................... | 707/202 |
| 5,875,444 A | 2/1999 | Hughes | | |
| 6,249,879 B1 | 6/2001 | Walker | | |
| 6,530,038 B1 * | 3/2003 | Hughes et al. | ................. | 714/15 |
| 6,584,582 B1 | 6/2003 | O'Connor | | |
| 6,892,328 B2 * | 5/2005 | Klein et al. | .................... | 714/42 |
| 6,895,413 B2 | 5/2005 | Edwards | | |
| 6,978,279 B1 * | 12/2005 | Lomet et al. | ................. | 707/202 |
| 7,035,808 B1 * | 4/2006 | Ford | .............................. | 705/7 |
| 7,076,692 B2 * | 7/2006 | Grey | ........................... | 714/15 |
| 7,200,626 B1 * | 4/2007 | Hoang et al. | ................. | 707/204 |
| 7,237,045 B2 * | 6/2007 | Beckmann et al. | ............ | 710/38 |
| 7,257,613 B2 * | 8/2007 | Boudnik et al. | ............. | 709/202 |
| 7,278,067 B1 * | 10/2007 | Coatney et al. | ................ | 714/54 |
| 7,389,313 B1 * | 6/2008 | Hsieh et al. | .................. | 707/204 |
| 2005/0060607 A1 * | 3/2005 | Kano | .......................... | 714/15 |
| 2005/0188087 A1 * | 8/2005 | Iyoda | .......................... | 709/226 |
| 2008/0215916 A1 * | 9/2008 | Archer et al. | ................. | 714/15 |

OTHER PUBLICATIONS

Wikipedia's SETI@home version from Sep. 20, 2005 http://en.wikipedia.org/w/index.php?title=SETI@home&oldid=23630780.*
"VERITAS Database Edition for Oracle; Frequently Asked Questions;" VERITAS Software Corporation; Dec. 2000.

* cited by examiner

*Primary Examiner*—Scott T Baderman
*Assistant Examiner*—Joseph Schell
(74) *Attorney, Agent, or Firm*—Meyertons, Hood, Kivlin, Kowert & Goetzel, P.C.; B. Noel Kivlin

(57) ABSTRACT

A system, method, and computer-accessible medium for storage management are disclosed. A failure condition is detected in a storage stack comprising a first host and a storage device. Data from the storage device is exported to a plurality of additional hosts. The data is validated using the plurality of additional hosts.

16 Claims, 9 Drawing Sheets

SYSTEM AND METHOD FOR DISTRIBUTED STORAGE VERIFICATION

BACKGROUND

1. Field of the Invention

This invention relates to storage management and, more particularly, to verification of data and storage resources in a multi-server networked environment.

2. Description of the Related Art

Enterprise computing environments are increasingly using configurations such as clustering, Storage Area Networks (SANs), and other centralized storage mechanisms to simplify storage, improve availability, and handle escalating demands for data and applications. Clustering may be defined as the use of multiple computers (e.g., PCs or UNIX workstations), multiple storage devices, and redundant interconnections to form what appears to external users as a single and highly available system. Clustering may be used for load balancing and parallel processing as well as for high availability.

The storage area network (SAN) model places storage on its own dedicated network. This dedicated network most commonly uses Fibre Channel or IP technology as a versatile, high-speed transport. The SAN includes one or more hosts that provide a point of interface with LAN users, as well as (in the case of large SANs) one or more fabric switches, SAN hubs, and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity to a wide range of servers and storage devices.

Of course, all storage approaches, including cluster and SAN-based solutions, are susceptible to failure. When a host crashes, minimizing downtime is critical. Although failover techniques may permit a second host to assume the duties of the crashed host, the storage resources previously associated with the crashed host may not be immediately available due to the need for verification and/or recovery. Using existing approaches, large storage resources may demand unacceptably large times for verification and recovery operations. In some cases, for example, an entire file system may be offline for hours while undergoing a full file system consistency check ("fsck") operation, and the host performing the operation may likewise be limited in its availability or capabilities. It is therefore desirable to improve the performance and availability of storage resources and servers associated with verification and/or recovery operations.

SUMMARY

A system, method, and computer-accessible medium for distributed storage verification are disclosed. The method may include detecting a failure condition in a storage stack comprising a first host and a storage device. The failure condition may indicate that the first host, storage device, or component of the connectivity layer has crashed, lost power, or is otherwise unable to continue providing access to the data on the storage device.

Additionally, the method may include exporting the data from the storage device to a plurality of additional hosts. The data may be exported to the plurality of additional hosts in response to detection of the failure condition. In one embodiment, task prioritization techniques may be used to select the additional hosts. The method may further include validating the data using the additional hosts. Validating the data may comprise running consistency checks, replaying logs, synchronizing volumes, or performing other operations to verify and/or recover the consistency of the storage stack. Different subsets of the data may be validated in parallel on different hosts. The exporting and validating may take place automatically, i.e., without user intervention.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
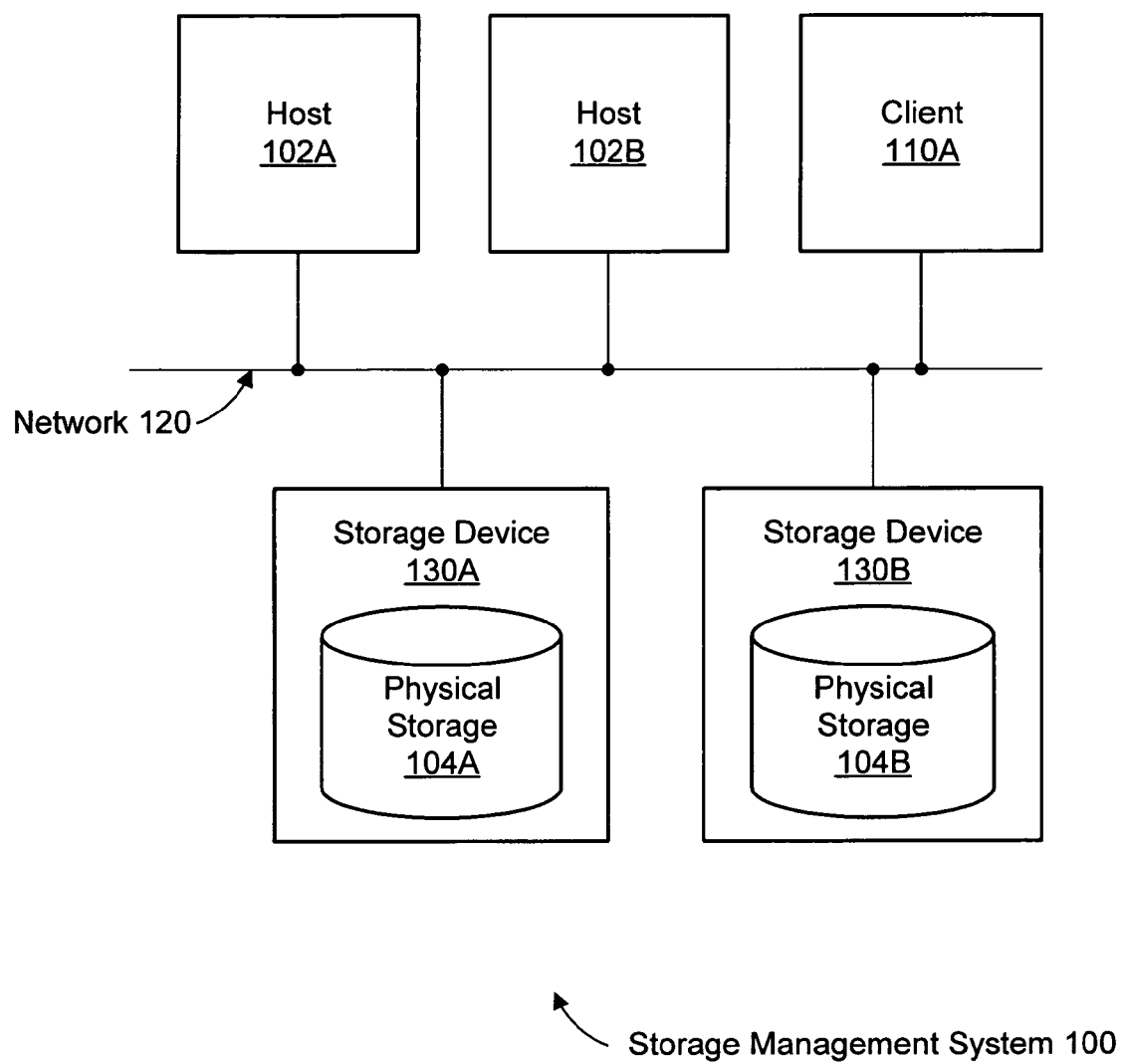
FIG. 1 illustrates a storage management system including distributed storage verification according to one embodiment.
Figure 2:
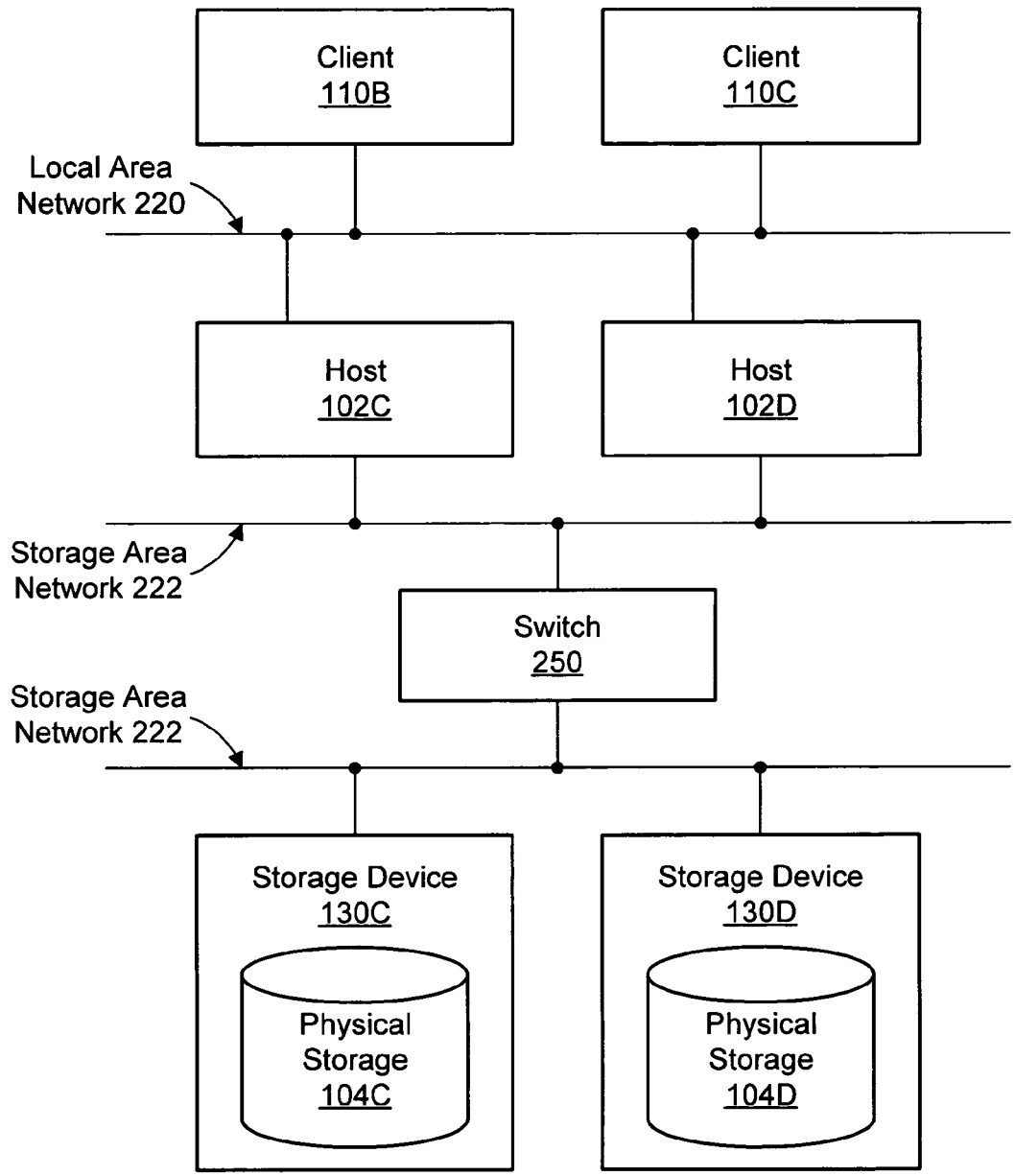
FIG. 2 illustrates a storage management system including distributed storage verification in a storage area network according to one embodiment.
Figure 3:
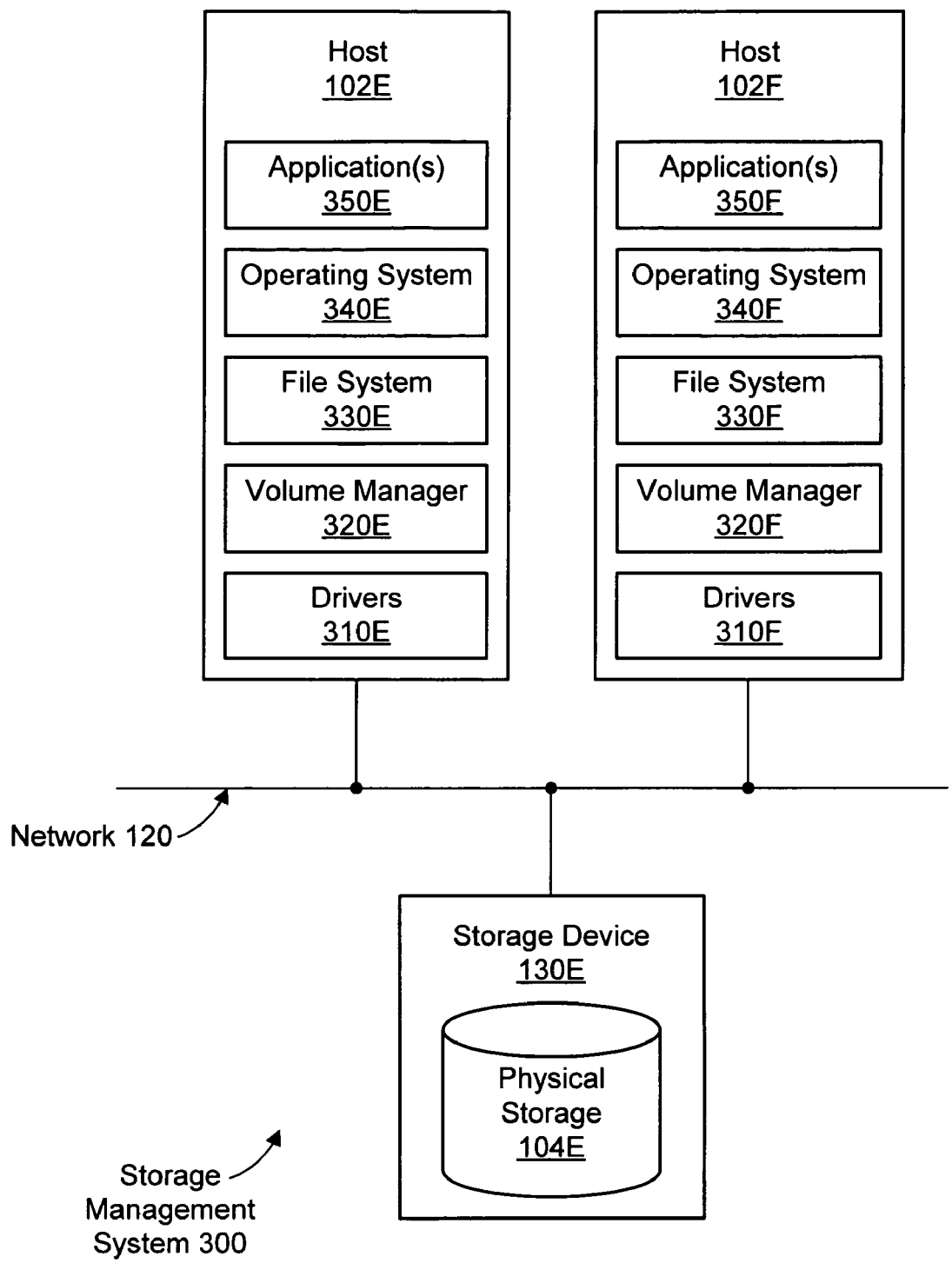
FIG. 3 illustrates internal components of host computer systems in a storage management system including distributed storage verification according to one embodiment.

Using the systems, methods, and computer-accessible media described herein, distributed storage verification is provided in a multi-server networked environment. The distributed storage verification may be used for verification and/or recovery of storage resources using a plurality of hosts in parallel. FIGS. 1-3 illustrate examples of storage configurations which may be used with the systems, methods, and computer-accessible media described herein. The example configurations shown in FIGS. 1-3 are intended to be illustrative rather than limiting, and other embodiments are possible and contemplated.

FIG. 1 illustrates a storage management system 100 including distributed storage verification according to one embodiment. As used herein, the term "storage management system" includes any system usable for management, configuration, or maintenance of storage resources. In the example shown in FIG. 1, the storage management system 100 includes two storage devices 130A and 130B coupled to a network 120. Each of the storage devices 130A and 130B includes at least one respective element of physical storage 104A and 104B representing the underlying media on which data is stored. In one embodiment, a storage device may comprise a plurality of physical storage modules configured, for example, as a storage array. Storage devices may include any of one or more types of storage devices including, but not limited to, storage systems such as RAID (Redundant Array of Independent Disks) systems, disk arrays, JBODs (Just a Bunch Of Disks, used to refer to disks that are not configured according to RAID), tape devices, and optical storage devices.

In various embodiments, the network 120 may comprise any local area network (LAN) such as an intranet or any wide area network (WAN) such as the Internet. The network 120 may use a variety of wired or wireless connection media. Wired connection media may include, for example, Ethernet, Fiber Channel media, or a modem connected to "plain old telephone service" (POTS). Wireless connection media may include, for example, a satellite link, a modem link through a cellular service, or a wireless link such as Wi-Fi.

In various embodiments, the storage management system 100 may employ any of a number of commercially available software products for storage resource management, such as, for example, various products available from VERITAS Software Corporation (Mountain View, Calif.). The software products for storage resource management may be installed and executed on storage hosts 102A and 102B which are coupled to the network 120. Elements of the various storage resource management software products, such as the software elements of the storage stack, are further discussed with reference to FIG. 3. Using the storage management software, the storage hosts 102A and 102B may provide access to the storage devices 130A and 130B for one or more storage-consuming clients 110A.

As used herein, the term "storage device(s)" or "storage device(s) 130" may refer collectively to any of the storage devices 130A-130E illustrated in FIGS. 1-3. As used herein, the term "physical storage(s)" or "physical storage(s) 104" may refer collectively to any of the physical storage 104A-104E illustrated in FIGS. 1-3. As used herein, the term "host(s)" or "host(s) 102" may refer collectively to any of the hosts 102A-102F illustrated in FIGS. 1-3. Hosts 102 may also be referred to herein as "servers." As used herein, the term "client(s)" or "client(s) 110" may refer collectively to any of the clients 110A-110C illustrated in FIGS. 1-3. As used herein, the term "storage management system(s)" may refer collectively to any of the storage management systems 100, 200, 300 illustrated in FIGS. 1-3.

In one embodiment, FIG. 1 may illustrate a Network-Attached Storage (NAS) environment. In a NAS environment, storage devices 130 may be directly attached to a network 120 (such as a local area network) using standard network protocols and may serve files to consumers on the network 120. In one embodiment, FIG. 1 may illustrate a Storage Area Network (SAN) approach (where the associated SAN fabric is not shown). An example SAN configuration is discussed in greater detail with respect to FIG. 2. In one embodiment, FIG. 1 may illustrate a storage management system using a cluster file system. A cluster file system enables concurrent file access to a single storage device 130 from multiple hosts 102.

FIG. 2 illustrates a storage management system 200 including distributed storage verification on a storage area network according to one embodiment. The SAN 222 may comprise a dedicated storage network in which servers or hosts (e.g., hosts 102C and 102D) and subsystems (e.g., switch 150) communicate with each other to manage the movement and storage of data on storage devices (e.g., storage devices 130C and 130D, comprising respective physical storage 104C and 104D). This dedicated network most commonly uses Fibre Channel technology as a versatile, high-speed transport. The hardware (e.g., switches, hubs, bridges, routers, cables, etc.) that connects hosts 102 to storage devices 130 in a SAN 222 is referred to as a "disk fabric" or "fabric." The SAN fabric may enable server-to-storage device connectivity through Fibre Channel switching technology to a wide range of hosts 102 and storage devices 130. In a SAN environment, clients (e.g., clients 110B and 110C) may send data to and receive data from the hosts 102 over a local area network 220 rather than communicate directly with the storage devices 130. In one embodiment, the SAN components may be organized into one or more clusters to provide high availability, load balancing, and/or parallel processing.

FIG. 3 illustrates internal components of hosts in a storage management system including distributed storage verification according to one embodiment. A host 102E may comprise a storage stack including an operating system 340E, a file system 330E, a volume manager 320E, and one or more drivers 310E. The storage stack may comprise additional elements such as additional layers of drivers, SAN fabric elements (e.g., switches), and/or elements of the storage device 130E or physical storage 104E. One or more applications 350E may comprise any suitable software which utilizes the storage stack for storage and/or retrieval of data on the storage device 130E. The drivers 310E may enable communication between the host 102E and the storage device 130E as well as any intervening network components.

Another host 102F may comprise similar elements including one or more applications 350F, an operating system 340F, a file system 330F, a volume manager 320F, and drivers 310F. In one embodiment, the applications 350F and components in the storage stack of the host 102F may differ in number and type from their counterparts in the other host 102E. As used herein, the term "application(s)" or "application(s) 350" may refer collectively to any of the applications 350E-350F. As used herein, the term "file system(s)" or "file system(s) 330" may refer collectively to any of the file systems 330E-330F. As used herein, the term "volume manager(s)" or "volume manager(s) 320" may refer collectively to any of the volume managers 320E-320F.

The file system 330 may comprise a system for organizing and accessing data stored on a storage device 130. Typically, a file system 330 organizes low-level units (e.g., blocks or sectors) of physical storage into a plurality of files and directories and supplies a hierarchical structure for the plurality of files and directories. The file system 330 may be used for the storage, hierarchical organization, manipulation, navigation, access, and retrieval of data. In one embodiment, the file system 330 may comprise an object-based file system. In one embodiment, the file system 330 may support journaling or intent logging. In one embodiment, the file system 330 may comprise the VERITAS File System product available from VERITAS Software Corporation (Mountain View, Calif.).

The volume manager 320 may comprise a system for managing one or more volumes. A storage device 130 may comprise one or more file systems 330, and a file system may comprise one or more volumes. As used herein, a "volume" or "logical volume" comprises a logical storage area within a file system. Logical volumes may be created from physical volumes such as hard disk partitions, RAID devices, or LUNs in a SAN. Typically, a volume is accessible to consumers such as applications 350 after being mounted at a mount point in the directory structure of the file system 330. The volume manager 320 may support various logical volume management techniques such as mirroring, striping, concatenation, snapshotting, changing the size of a volume, and other forms of volume manipulation. In one embodiment, the volume manager 320 may comprise the VERITAS Volume Manager product available from VERITAS Software Corporation (Mountain View, Calif.).

A storage operation may comprise multiple steps at various points in the storage stack. For example, updating a file system to reflect changes to files or directories may require multiple writes, modifications to inodes, modifications to a free space map, etc. If a storage operation is interrupted by the failure of a host 102, the storage stack may be left in an invalid intermediate state. Such failures may be induced, for example, by an operating system crash or power loss.

Therefore, in the event of a failure of a host 102, it is desirable to verify the state of the storage stack. Additionally, the storage management system may include a failover capability such that one or more other hosts 102 may automatically assume the responsibilities of the failed host. As discussed below, the storage management system may provide distributed storage verification using a plurality of additional hosts to verify the storage affected by the failure.

Figure 4:
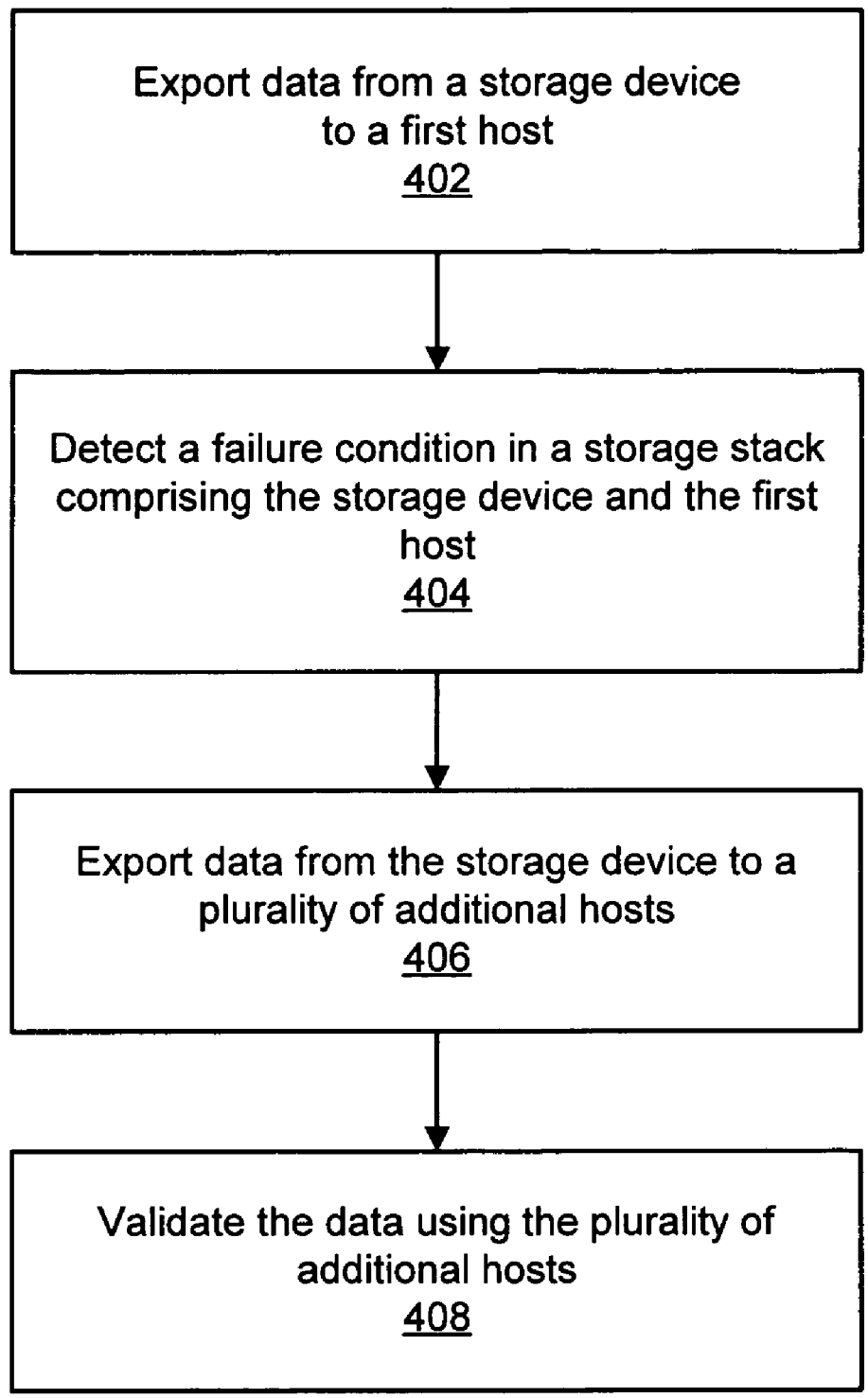
FIGS. 4 and 4B are flowcharts illustrating methods for distributed storage verification according to one embodiment.

FIG. 4 is a flowchart illustrating a method for distributed storage verification according to one embodiment. Blocks that are implemented in software may represent a plurality of instructions comprising the software which, when executed on a suitable computer system, perform the function(s) described for the blocks. In 402, data is exported from a storage device to a first host. As used herein, "exporting" data from a storage device to a host comprises making the data stored on the storage device accessible to the host and typically modifiable by the host. The data may include metadata such as metadata relating to one or more file systems, volumes, or application data sets. Exporting the data may comprise locally mounting the data as one or more volumes within a file system at the host. After the data is exported to the host, the host may perform file system operations (e.g., reading, writing, deleting, moving, etc.) and/or volume management operations on the data, and the host may make the data accessible to one or more client systems 110. As discussed with reference to FIG. 3, the storage stack may include software and/or hardware elements of the first host, the storage device, and any components in a connectivity layer (e.g., the SAN fabric) between the first host and the storage device. Exporting the data from the storage device to the host may also be referred to herein as importing the data at the host from the storage device.

In 404, a failure condition is detected in the storage stack. The failure condition may indicate that the first host, the storage device, or any intermediate element in the connectivity layer has crashed, lost power, or is otherwise unable to continue providing access to the data on the storage device. A failure condition may be detected, for example, by the unresponsiveness of any portion of the storage stack to communication requests from clients, storage devices, elements in the connectivity layer (e.g., switches), or other servers. In one embodiment, the failure condition may be detected by a component in the storage management system which implements and directs the failover capability. In one embodiment, the failure condition may be detected using conventional cluster management techniques such as the detection of a missing "heartbeat" between two hosts.

In 406, at least a portion of the data is exported from the storage device to a plurality of additional hosts (e.g., a second host and a third host). By exporting the data to the additional hosts, the additional hosts may gain the ability to access and/or modify the data. Exporting the data to the additional hosts may comprise giving the additional hosts access to relevant file system metadata (e.g., intent logs or other journaling data), volume metadata (e.g., dirty region logs), and/or application metadata (e.g., database logs) stored on the storage device and previously maintained by the first host. In one embodiment, a first subset of the data may be exported to the second host, and a second subset of the data may be exported to the third host. For example, one set of file systems or volumes may be exported to the second host, and another set of file systems or volumes may be exported to the third host. In one embodiment, the subsets of data may be exported to the hosts in parallel.

Figure 4B:
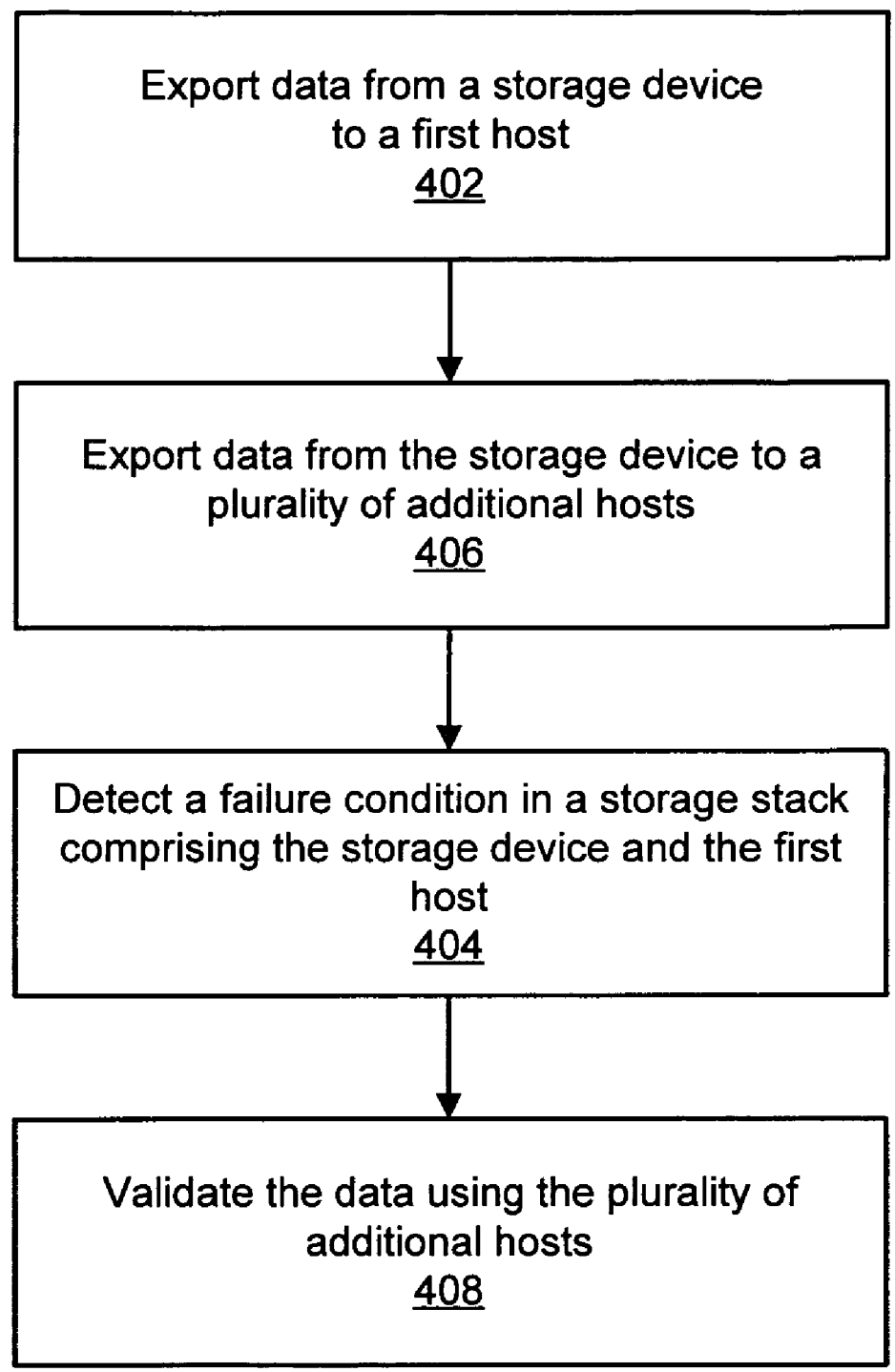

In one embodiment, the exporting step 406 may take place automatically, i.e., without user intervention, and programmatically, i.e., according to computer-executable program instructions. In one embodiment, the exporting step 406 may be performed in response to detecting the failure condition in 404. In another embodiment illustrated by FIG. 4B, the exporting step 406 may take place prior to detecting the failure condition, such that components are pre-positioned to recover from a failure.

As a result of the failure, the consistency of the storage stack is uncertain. Therefore, all or part of the data may be validated using the additional hosts in 408. For example, a first subset of the data such as one set of file systems or volumes may be validated by a second host, and a second subset of the data such as another set of file systems or volumes may be validated by a third host. In one embodiment, the various subsets of data may be validated by the hosts in parallel. Validating the data may comprise running consistency checks, replaying logs, synchronizing volumes, or performing other operations to verify and/or recover the state of the storage stack at the time of the failure. Specific examples of data validation are discussed in greater detail below.

In one embodiment, the validating step 408 may be performed in response to detecting the failure condition. In one embodiment, the validating step 408 may take place automatically, i.e., without user intervention, and programmatically, i.e., according to computer-executable program instructions. In one embodiment, steps 406 and 408 may occur substantially simultaneously.

In one embodiment, after validating the data, one or more of the additional hosts may assume the responsibilities of the first host with regard to the data on the storage device, such as providing storage access to client systems 110. In one embodiment, the first host may resume its management of the data on the storage device after completion of the storage validation and recovery from the failure condition.

The validation step 408 may be applied to various elements of data such as one or more file systems, volumes, application-level data sets, and/or other suitable targets. The nature of the validation may vary depending upon the nature of the target. In one embodiment, validation of a file system may comprise replaying a file system log (in a file system with journaling or intent logging) and/or performing a full file system consistency check (fsck). In one embodiment, validation of a volume may comprise replaying a dirty region log (DRL) for the volume and/or synchronizing volume data for the volume. In one embodiment, validation of application-level data may comprise replaying an application log for the application or checking other application files.

Replaying a file system log may serve to quickly restore the file system to its proper state at the time of the failure. In a file system which includes journaling or intent logging, the file system may write to an intent log (e.g., on a separate volume) before and after updating file system metadata. To recover after a failure, the changes recorded in the intent log but not reflected on the storage device may be replayed until the consistency of the file system is established.

Typically, a full file system consistency check is a much slower operation than a log replay. The full file system consistency check may scan all file system metadata to determine the consistency of the file system. Any discrepancies in the file system metadata may be corrected. While the full file system consistency check is performed, the file system is typically not accessible to or usable by applications. In one embodiment, performing the full file system consistency check may comprise checking the file system for any of the following inconsistencies: blocks claimed by more than one inode, blocks claimed by an inode outside the range of the file system, incorrect link counts, size checks (e.g., incorrect number of blocks, directory entry format), bad inode format, blocks unaccounted for, directory checks (e.g., file pointing to unallocated inode, inode number out of range, linkage to parent directory, hash chain linkage, free space count), superblock checks (e.g., checksum mismatch, more blocks for inodes than blocks in the file system), structural files (e.g., fileset headers, object location table, inode list files, inode allocation summary files, attribute files, attribute link counts), bad free block list format, or total free block and/or free inode count incorrect.

Replaying a dirty region log (DRL) may enable relatively quick recovery of mirrored volumes after the failure. Dirty region logging may logically divide a volume into a set of consecutive regions and track which regions are modified. In the dirty region log, a status bit may represent each region of the volume. For any write operation to the volume, the relevant regions may be marked "dirty" in the log before the data is written. The modified region may remain marked as dirty until the corresponding volume region becomes the least recently used. The dirty region log may be used to recover only the portions of the volume that have been modified (i.e., marked as dirty). In one embodiment, log subdisks may store the dirty region log of a DRL-enabled volume. In one embodiment, a similar technique may be used for quick recovery of RAID-5 volumes having RAID-5 logs.

However, if DRL is not used and a system failure occurs, the mirrors of the volumes should be restored to a consistent state by copying the full contents of the volume between its mirrors or RAID-5 volumes. This process of synchronizing volume data may be referred to herein as volume resynchronization, and it may be lengthy and I/O intensive. In one embodiment, tasks associated with volume resynchronization may be divided among one or more volume managers, file systems, and applications for optimal recovery. In one embodiment, volumes that were quiescent (i.e., had no active I/O) at the time of the failure may be excepted from the volume resynchronization process.

The granularity of application data recovery may, of course, be limited by the nature of any recovery facilities provided by the application. Replaying an application log may enable an application to restore application-level data to its proper state at the time of the failure. For example, a database management system (DBMS) may replay changes logged in a transaction database to detect errors and/or recover application data. E-mail management systems and other transaction-based systems may employ replay logs in a similar manner. Other applications may check for the presence or absence of lock files or temporary files to determine and/or restore data consistency.

In one embodiment, failures may occur at any point in the storage stack, from the host to the connectivity layer to the storage device itself. Appropriate recovery tasks may vary accordingly. For example, if the failure occurred in a switch, then a recovery task such as a full fsck or log replay may be needed to recover the I/O from the indeterminate state left by the failure. As another example, a volume resynchronization and/or full fsck may be needed if data has been improperly modified and potentially corrupted by an administrator who bypassed normal file-system access methods. If the failure occurred in the storage device or connectivity layer, the first host may participate in the recovery process by distributing recovery tasks to other hosts and/or validating a portion of the data itself. In this case, the "plurality of additional hosts" referred to in FIGS. 4 and 4B may include the first host and one or more additional hosts.

In one embodiment, the storage verification may be performed in a two-stage manner. In a first stage, relatively fast recovery tasks such as a file system log replay or a DRL replay may be performed or attempted. Typically, the fast recovery tasks may be performed by a single host. However, the fast recovery tasks may also be distributed to a plurality of hosts as discussed with reference to FIGS. 4 and 4B. In a second stage, relatively slow recovery tasks such as a full fsck or volume resynchronization may be performed. The relatively slow recovery tasks may be deemed necessary, for example, if the relatively fast recovery tasks could not be successfully completed in the first stage. The relatively slow recovery tasks may be performed by a plurality of hosts in the distributed manner discussed above.

As discussed above, validation techniques for a given type of metadata may vary greatly in the amount of resources they consume. For example, a full file system consistency check will typically take much longer than an intent log replay, and a volume resynchronization will typically take much longer than a dirty region log replay. Additionally, hosts throughout the storage management system may vary in their available resources, speed, etc. To optimize the usage of resources throughout the storage management system, task prioritization may be used to assign validation tasks for particular storage resources to particular hosts. In one embodiment, the task prioritization may be performed by a task prioritization component in the storage management system. The task prioritization component may be implemented by the component responsible for managing the failover capability of the storage management system.

Figure 5:
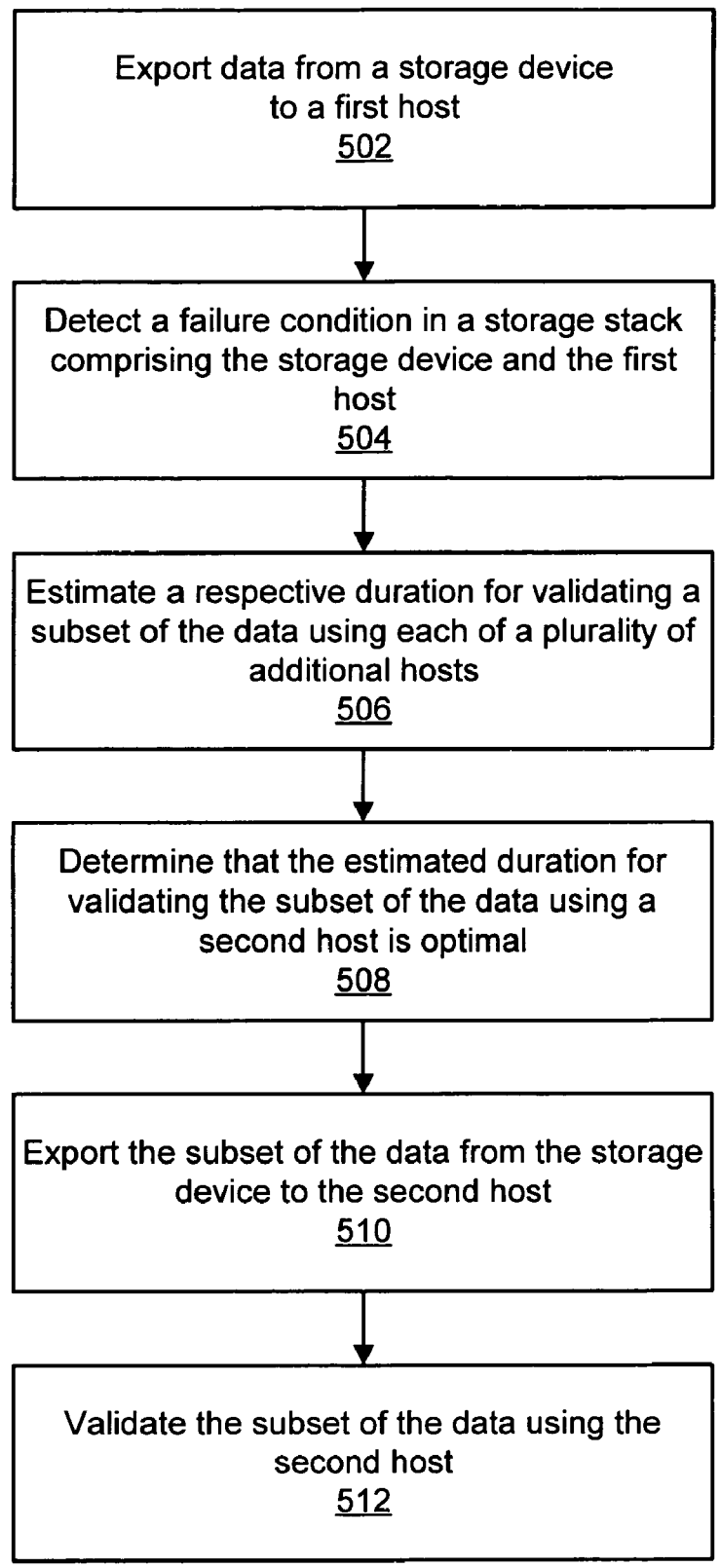
FIGS. 5 and 5B are flowcharts illustrating methods for distributed storage verification including task prioritization according to one embodiment.

FIG. 5 is a flowchart illustrating a method for distributed storage verification including task prioritization according to one embodiment. As discussed with respect to FIGS. 4 and 4B, data may be exported from a storage device to a first host in 502, and a failure condition may be detected in the storage stack in 504. In 506, a respective duration is estimated for validating the data using each of a plurality of hosts. For each host, the estimated duration may be based on information determined prior to the failure for the host and/or the storage device. For example, one or more metrics may be generated for each host to designate its available memory resources, I/O resources, speed, etc. Metrics may likewise be generated for storage resources (e.g., file systems, mirrored volumes) to predict the likely recovery time based on the size of the resource, the number of inodes or files, the availability of file system logs or dirty region logs, etc. In one embodiment, these metrics and/or the underlying data (e.g., the number of inodes in a file system) may be collected and stored prior to the failure and at a regular interval. Where feasible, the metrics and/or underlying data may also be collected or adjusted after the failure. In various embodiments, the metrics and/or underlying data may be stored on the storage device and/or elsewhere in the storage management system.

In one embodiment, the estimation process may comprise determining a set of demands for each validation task and a set of resources for each host. For a file system, the demands may include support for journaling or intent logging, the availability of the intent log, the size and complexity of the file system, the number of files within the file system, etc. For a volume, the demands may include support for dirty region logging, the availability of the dirty region log, whether the volume is part of a mirror or RAID-5, the size of the volume, etc. For a application data, the demands may include the availability of a recent snapshot, the availability of transaction logs, etc. On the server side, the available resources may include I/O latency and throughput from the host to the affected storage device, the number of paths from the host to the affected storage device and the bandwidth of those paths, the overall system speed (e.g., as influenced by the CPU), the available memory resources, etc.

In 508, it is determined that the estimated duration for validating the data using a particular host (e.g., the second host) is optimal. The determination of an "optimal" solution may be based on priorities established by an administrator. Typically, the highest priority will be minimizing recovery time. However, it may also be a priority to maintain the availability of certain hosts for other tasks. Additionally, recovery of particular storage resources may be designated with higher priorities than recovery of other storage resources. Another factor may be a configuration equivalency such as the ability of another host to run the same application(s) as the first host.

Figure 5B:
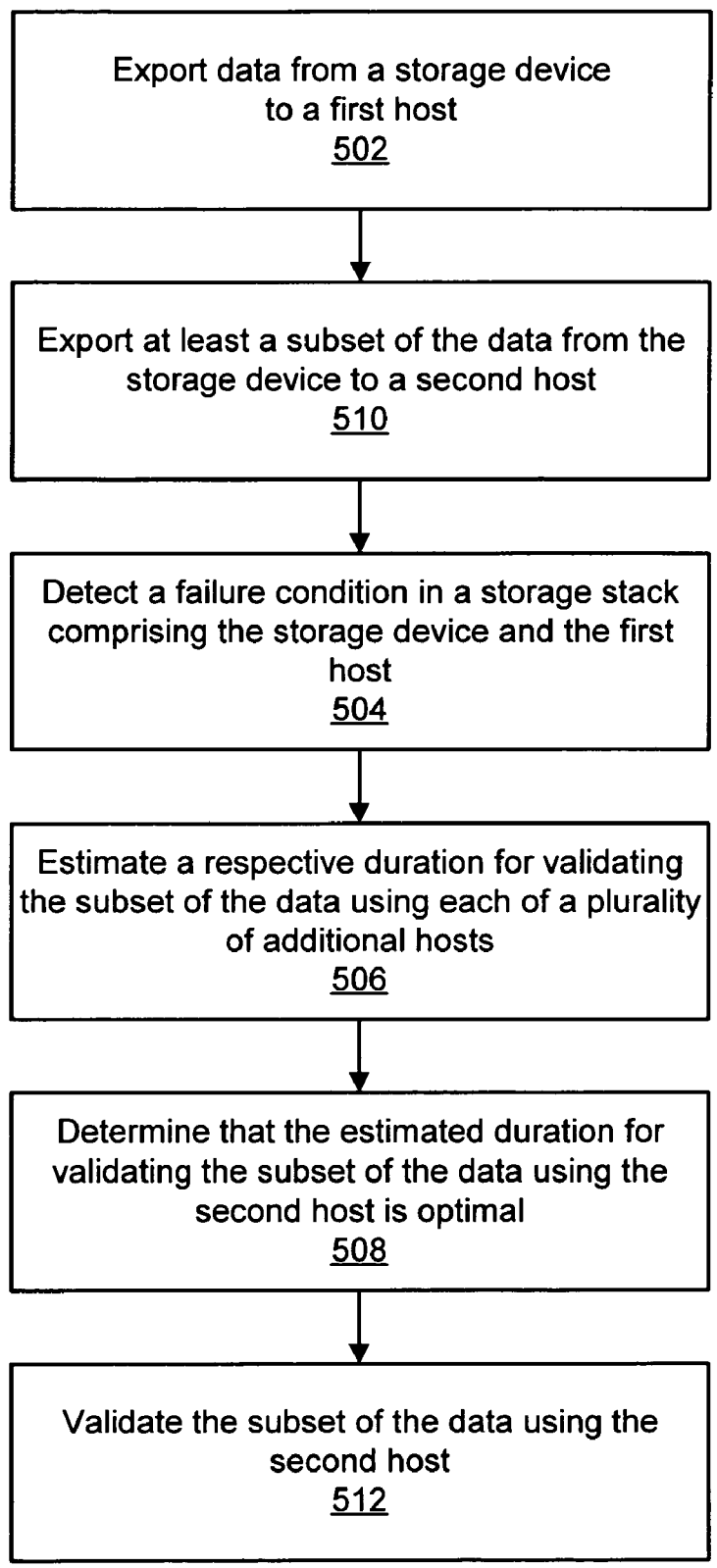

In response to determining that the estimated duration for validating the data using the second host is optimal, the data may be exported from the storage device to the second host in 510. Alternatively, as illustrated in FIG. 5B, the data may be exported prior to the failure, such that components are pre-positioned to recover from a failure. As discussed with respect to FIGS. 4 and 4B, the data may be validated using the second host in 512. In one embodiment, network connections between the storage device(s) and the one or more hosts involved in the recovery may be reconfigured to adjust the bandwidth needed for performance of the validation. In one embodiment, any of the steps shown in FIG. 5 or 5B may take place automatically, i.e., without user intervention, and programmatically, i.e., according to computer-executable program instructions.

In one embodiment, task prioritization may be used to select a plurality of hosts for validation in parallel of a plurality of data sets. For example, to ensure the most rapid recovery for both volumes on a storage device, the validation of the larger volume (via full resync) may be assigned to a faster host, and the validation of the smaller volume (via full resync) may be assigned to a slower host. On the other hand, if recovery of the smaller volume is a higher priority than recovery of the larger volume, the validation of the smaller volume may instead be assigned to the faster host.

In one embodiment, the task prioritization may continue after the validation has begun. For example, if a particular recovery task is taking longer than estimated, that task may be reassigned to a different host. If priorities are changed during a recovery task, the assignments of various hosts may be modified accordingly. In one embodiment, conventional load-balancing techniques may be used to implement the ongoing task prioritization.

Figure 6:
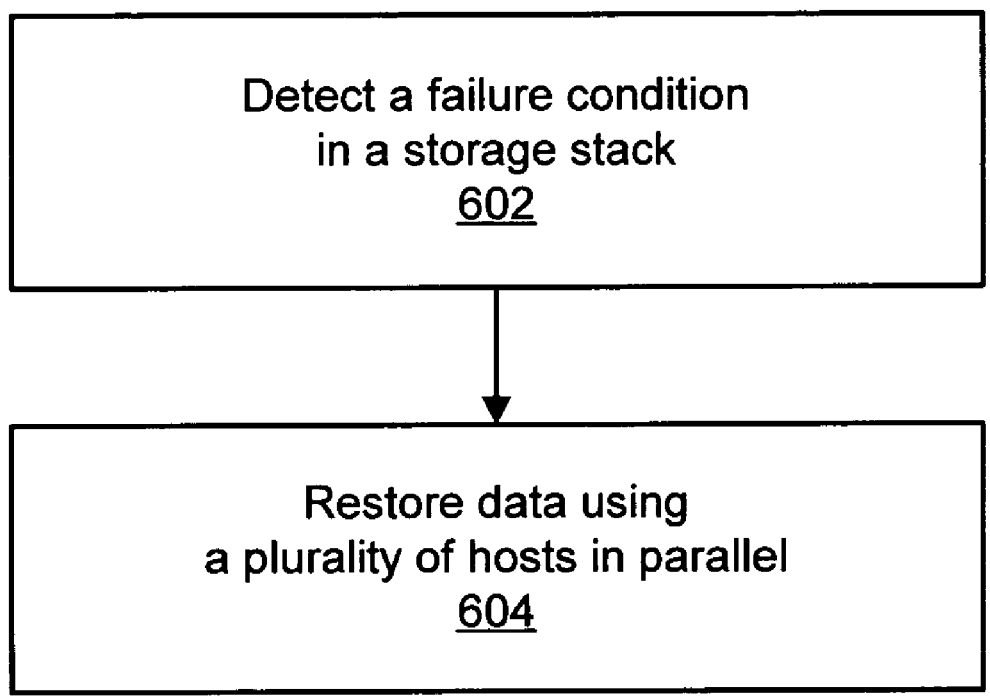
FIG. 6 is a flowchart illustrating a method for parallel distributed storage recovery according to one embodiment.

The distributed and parallel techniques discussed with reference to FIGS. 4-5 may also be applied to data recovery tasks. FIG. 6 is a flowchart illustrating a method for parallel distributed storage recovery according to one embodiment. In one embodiment, any of the steps illustrated in FIG. 6 may be performed automatically and programmatically, i.e., without user intervention. In 602, a failure condition may be detected in a storage stack. In 604, the data on the affected storage device may be restored using a plurality of hosts in parallel. The data may be restored from the last valid backup or copy (e.g., tape, archive file, mirrored volume, RAID-5 volume). The data may be restored to the first storage device and/or one or more additional storage devices. The task prioritization techniques discussed with reference to FIGS. 5 and 5B may be used to perform the parallel distributed recovery in an optimal manner.

In one embodiment, a new file system is created on the affected storage device. Prior to restoring the data, the new file system should be mounted by the host(s) assisting in the recovery. In one embodiment, a "bare" restore may be performed. Various tunable parameters and configuration parameters may be determined prior to the restoration. In one embodiment, volume restoration may be necessary if the failed storage device suffered physical or low-level failure.

In one embodiment, the data may be appropriately partitioned to facilitate the recovery in parallel. For example, if a storage device comprises a plurality of volumes, the recovery of the different volumes may be assigned to respective different hosts. Likewise, multiple file systems may be partitioned along file system boundaries. Data may be further partitioned at the time of backup, at the time of restoration, or at any point in between.

Exemplary Computer Systems

Figure 7:
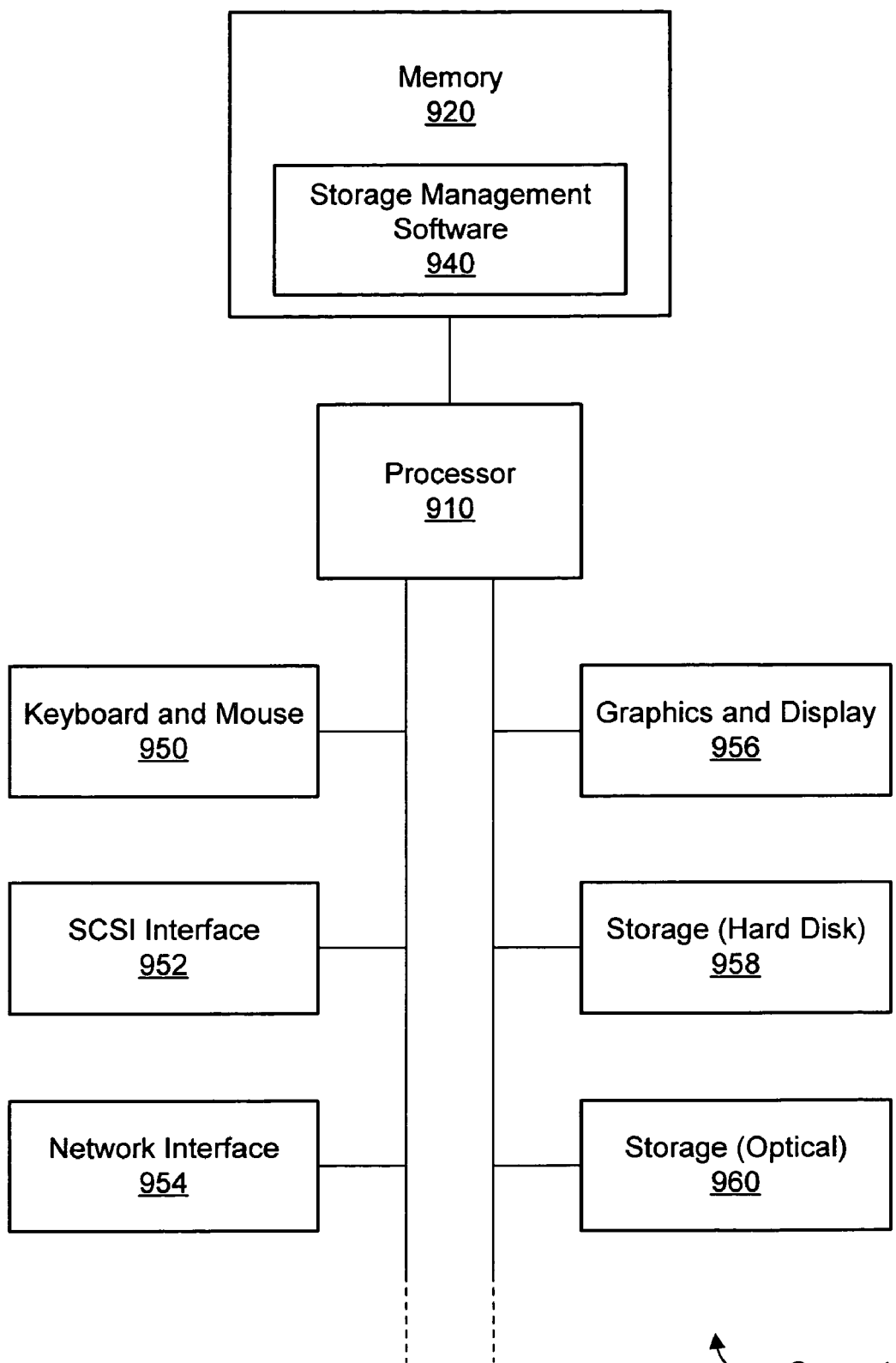
FIG. 7 illustrates a block diagram of a typical computer system for implementing embodiments of the systems and methods described above.

FIG. 7 illustrates a block diagram of a typical computer system 900 for implementing embodiments of the systems and methods described above for storage management. Computer system 900 may be illustrative of a host 102, client 110, and/or storage device 130. As used herein, "computing device" is synonymous with "computer system." Computer system 900 includes a processor 910 and a memory 920 coupled by a communications bus. Processor 910 can be a single processor or a number of individual processors working together. Memory 920 is typically random access memory (RAM), or some other dynamic storage device, and is capable of storing instructions to be executed by the processor, e.g., storage management software 940. Memory 920 is also used for storing temporary variables or other intermediate information during the execution of instructions by the processor 910.

Computer system 900 may also include devices such as keyboard & mouse 950, SCSI interface 952, network interface 954, graphics & display 956, hard disk 958, and other nonvolatile storage 960, all of which are coupled to processor 910 by a communications bus. In various embodiments, nonvolatile storage 960 may include optical media devices such as read-only or writable CD or DVD, solid-state devices such as nonvolatile RAM, or any other suitable type of nonvolatile storage. It will be apparent to those having ordinary skill in the art that computer system 900 can also include numerous elements not shown in the figure, such as additional storage devices, communications devices, input devices, and output devices, as illustrated by the ellipsis shown. An example of such an additional computer system device is a Fibre Channel interface.

Those having ordinary skill in the art will readily recognize that the techniques and methods discussed above can be implemented in software as one or more software programs, using a variety of computer languages, including, for example, traditional computer languages such as assembly language, Pascal, and C; object oriented languages such as C++ and Java; and scripting languages such as Perl and Tcl/Tk. In some embodiments, software 940 may comprise program instructions executable, for example by one or more processors 910, to perform any of the storage management functions or methods described above. Also, in some embodiments software 940 can be provided to the computer system via a variety of computer-accessible media including electronic media (e.g., flash memory), magnetic storage media (e.g., hard disk 958, a floppy disk, etc.), optical storage media (e.g., CD-ROM 960), and communications media conveying signals encoding the instructions (e.g., via a network coupled to network interface 954). In some embodiments, separate instances of these programs can be executed on separate computer systems in keeping with the methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computing systems with variations in, for example, the number of nodes, the type of operation of the computing system, e.g., cluster operation (failover, parallel, etc.), the number and type of shared data resources, and the number of paths between nodes and shared data resources.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method comprising:
   in response to detection of a failure condition in a storage stack that includes a first host computer and a storage device, exporting data from the storage device to a plurality of additional host computers;
   validating the exported data using the plurality of additional host computers, including using at least two of the plurality of additional host computers to collectively perform, in parallel, a full file system consistency check of a file system that includes the exported data, including:
      estimating a first duration for validating a subset of the data corresponding to a volume of the file system using at least a first one of the plurality of additional host computers;
      estimating a second duration for validating the subset of the data using at least a second one of the plurality of additional host computers;
      determining that the estimated first duration for validating the subset of data is a shorter amount of time than the estimated second duration for validating the subset of the data; and
      in response to the determination, assigning the first additional host computer to validate the subset of the data.

2. The method of claim 1, wherein the file system is a cluster file system.

3. The method of claim 1,
   wherein exporting the data from the storage device to the plurality of additional host computers includes locally mounting the file system at one of the plurality of additional host computers.

4. The method of claim 1,
   wherein validating the data includes replaying a file system log for two or more logical volumes of the file system.

5. The method of claim 1,
   wherein the data corresponds to a volume of the file system; and
   wherein validating the data includes synchronizing volume data for the volume.

6. The method of claim 1,
   wherein the data corresponds to a volume of the file system; and
   wherein validating the data includes replaying a dirty region log for the volume.

7. The method of claim 1,
   wherein the data was modified by an application running on the first host computer; and
   wherein validating the data comprises replaying an application log for the application.

8. The method of claim 1, further comprising:
   in response to validating the subset of the data at the second host computer taking longer than estimated, reassigning the validating of the subset of the data to another one of the plurality of host computers.

9. A system comprising:
   a shared storage device having stored thereon data associated with a file system; and
      at least two host computers in a plurality of host computers coupled to the shared storage device, wherein each host computer comprises at least one respective processor and a respective memory storing program instructions, wherein the plurality of hosts are collectively configured to:
      import the data from the shared storage device in response to a failure in the shared storage device;
      validate the imported data, including the at least two host computers performing, in parallel, a full file system consistency check of the file system; and
      for a given subset of the data corresponding to a volume of the file system, select one of the plurality of host computers to validate the subset of the data;
      wherein validating the subset of the data at the selected host computer is estimated to take less time than validating the subset of the data at another one of the plurality of host computers.

10. The system of claim 9, further comprising:
    a storage stack comprising a first host computer in the plurality of host computers and the shared storage device;
    wherein the plurality of hosts are collectively configured to import the data from the shared storage device in response to a failure in the storage stack.

11. The system of claim 9,
    wherein the data corresponds to two or more file systems including the file system; and
    wherein, in importing the data from the shared storage device, two or more of the plurality of hosts are configured to locally mount a respective one of the two or more file systems.

12. The system of claim 9, wherein the program instructions are further executable to:
    validate the data by replaying a journaling log, wherein the data includes metadata for the file system.

13. The system of claim 9, wherein the file system is a cluster file system.

14. A computer-accessible storage medium comprising program instructions executable by a first one of a plurality of host computers to perform a method, the method comprising:
    in response to a failure condition in a storage stack comprising a storage device, importing a subset of data from the storage device, wherein the data is located within a file system; and
    performing a portion of a full file system consistency check of the file system on the subset of the data, wherein the portion of the full file system consistency check is performed in parallel with at least one other of the plurality of host computers performing another portion of the full file system consistency check;

wherein said performing is in response to a determination that an estimated duration for the first host computer validating the subset of data is a shorter amount of time than an estimated duration for another one of the plurality of host computers validating the subset of data.

15. The computer-accessible storage medium of claim 14, wherein the subset of the data includes metadata associated with the file system, and wherein the method further comprises replaying a journaling log.

16. The computer-accessible storage medium of claim 14, wherein the data corresponds to a volume of the file system.

* * * * *

UNITED STATES PATENT AND TRADEMARK OFFICE
CERTIFICATE OF CORRECTION

PATENT NO.       : 7,657,796 B1                                         Page 1 of 1
APPLICATION NO.  : 11/241256
DATED            : February 2, 2010
INVENTOR(S)      : Kaiser et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1064 days.

Signed and Sealed this

Thirtieth Day of November, 2010

David J. Kappos
*Director of the United States Patent and Trademark Office*